(12) United States Patent
Sena

(10) Patent No.: US 8,589,806 B1
(45) Date of Patent: Nov. 19, 2013

(54) ONLINE MEETING SYSTEMS AND METHODS FOR HANDHELD MACHINES

(75) Inventor: Raffaele Sena, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 535 days.

(21) Appl. No.: 12/550,070

(22) Filed: Aug. 28, 2009

(51) Int. Cl.
*G06F 3/048* (2013.01)
*G06F 15/16* (2006.01)

(52) U.S. Cl.
USPC .......................................... 715/753; 715/765

(58) Field of Classification Search
USPC ................................................ 715/753, 765
See application file for complete search history.

(56) References Cited

U.S. PATENT DOCUMENTS

| | | | | |
|---|---|---|---|---|
| 6,046,761 | A * | 4/2000 | Echerer | 348/14.01 |
| 2008/0065974 | A1 * | 3/2008 | Campbell | 715/200 |
| 2008/0126953 | A1 * | 5/2008 | Davidson et al. | 715/753 |
| 2009/0192845 | A1 * | 7/2009 | Gudipaty et al. | 705/7 |
| 2011/0041085 | A1 * | 2/2011 | Hardebeck et al. | 715/753 |

\* cited by examiner

*Primary Examiner* — Andrea Leggett
(74) *Attorney, Agent, or Firm* — Schwegman Lundberg Woessner P.A.

(57) ABSTRACT

Systems, methods, and apparatuses are described for providing a customized interface to a handheld collaboration machine. Some exemplary methods described include receiving sign-in information from the handheld collaboration machine. The sign-in information may correspond to an unmodified online meeting environment comprising a plurality of components. One or more customization factors of the handheld collaboration machine may be identified. The unmodified online meeting environment may be modified by removing at least one component of the plurality of components based on the customization features to generate the modified online meeting environment. The modified online meeting environment is then provided to the handheld collaboration machine.

20 Claims, 8 Drawing Sheets

ONLINE MEETING SYSTEMS AND METHODS FOR HANDHELD MACHINES

BACKGROUND

In an online meeting environment, participants (i.e., users of the meeting environment) may interact using a variety of components, such as a video feed from a web camera, a whiteboard, a chat room, a document reader, a list of participants, a shared notepad, a form-filling tool, file-sharing tools, as well as audio input from each participant. The components actually used in any given meeting may be determined by the user who organized the meeting. An example of an online meeting environment is provided in U.S. patent application Ser. No. 11/864,631 filed Sep. 28, 2007 and entitled, "Declarative Specification of Collaboration Client Functionality."

DETAILED DESCRIPTION

Participants in an online meeting may use multiple components of an online meeting environment to express thoughts and ideas. In addition to voice and video data, the components may communicate visual data including, but not limited to, chat room conversations, shared notes, screenshots, document or slideshow viewers, whiteboards, and the like. Further, other resources associated with the meeting, such as a list of participants, downloadable documents, and/or forms, may also be made available to the participants via the components. The processing, memory, and display space required to support each component may require that the participants each participate using a non-handheld machine such as a desktop computer or a laptop computer.

To allow participants to join an online meeting using a handheld mobile machine, such as a smart phone, the online meeting environment may be modified to use, for example, less bandwidth, less memory, less processing power, and/or less components. The online meeting environment is typically modified by a central server in response to a communication from a handheld machine of a participant. The communication may include a mode selection, an inventory of requested components, and/or data collected from the handheld machine such as a geographic location.

The modified online meeting environment may include fewer components or more components than the online meeting environment accessed by users of non-handheld machines. Some components may be replaced by modified versions of the component to accommodate lower bandwidths or other factors. In some instances, some features may not be available at the handheld machines that are otherwise available when accessing the online meeting environment via a non-handheld machine.

Figure 1:
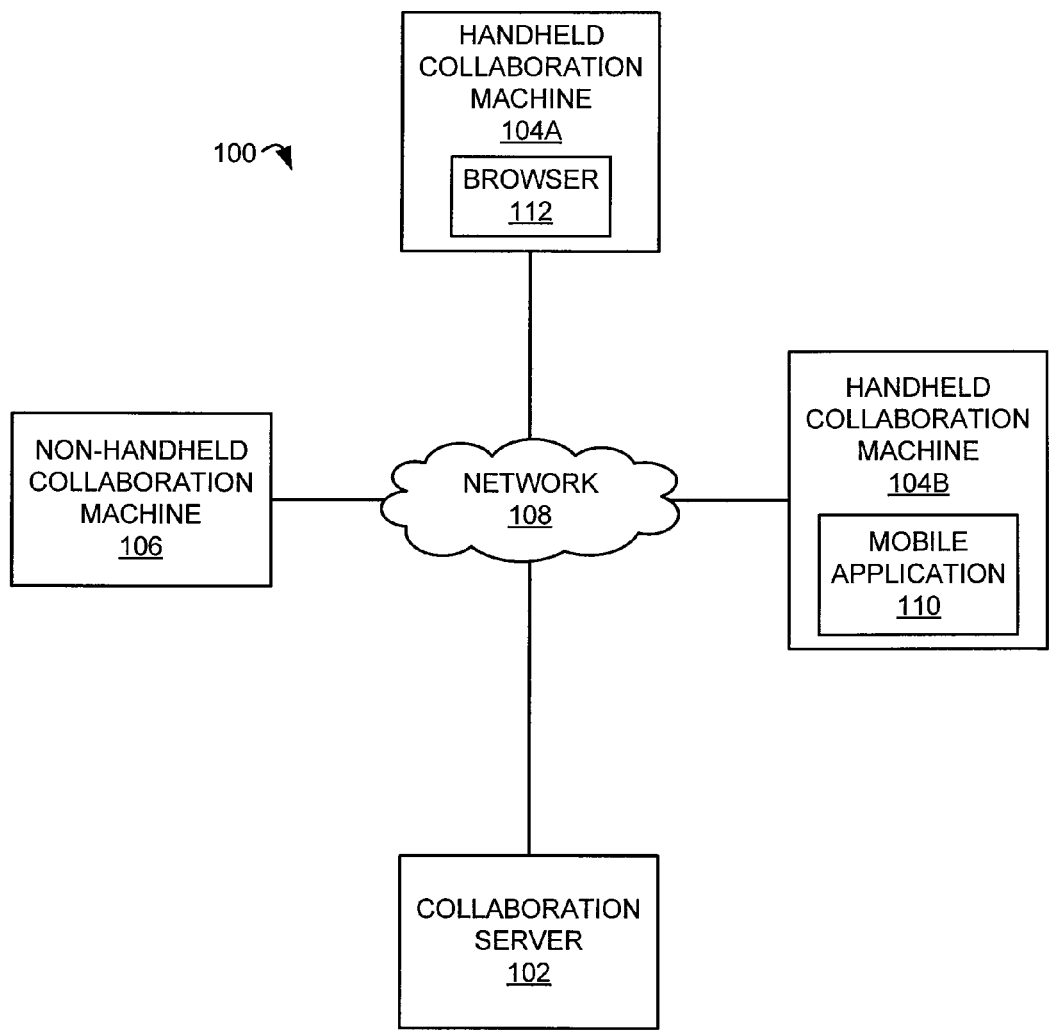
FIG. 1 is a block diagram of an online meeting architecture according to various embodiments.

FIG. 1 is a block diagram of an online meeting architecture 100 according to various embodiments. An online meeting environment may be generated and presented by the online meeting architecture 100. For example, the online meeting environment may provide user interfaces for an online meeting that, in turn, facilitate a series of communications within the online meeting architecture 100.

In the online meeting architecture 100, a collaboration server 102 is communicatively coupled to a first handheld collaboration machine 104A, a second handheld collaboration machine 104B, and a non-handheld collaboration machine 106 via a network 108. The network 108 may comprise a private network or a public network, this such as the Internet. In some instances, the network 108 may additionally include the public switched telephone network (PSTN) or a cellular network (e.g., CDMA, GSM, etc.) to communicate voice signals.

The collaboration server 102 operatively controls communications between participants in an online meeting environment. The collaboration server 102 provides a graphical user interface (GUI) to each of the (handheld and non-handheld) collaboration machines 104 and 106 associated with an online meeting. During the online meeting, the collaboration server 102 updates the online meeting environment based on communications received from each of the collaboration machines 104 and 106. The collaboration server 102 may coordinate multiple simultaneous online meeting environments each associated with a distinct set of collaboration machines.

The handheld collaboration machines 104A and 104B comprise handheld devices that are used by meeting participants to access the online meeting environment. The respective handheld collaboration machines 104A and 104B may have different features and/or be able to access different sets of online meeting components. The collaboration server 102 may provide a modified or customized version of the online meeting environment to each of that the handheld collaboration machines 104A and 104B based on one or more hardware, software, or networking specifications of the respective machines.

The handheld collaboration machine 104A host a browser 112 to present content to the user accessed via the network 108. The browser 112 comprises a handheld browser (e.g., a mini browser) that resides on the handheld collaboration machine 104A. One example of a handheld browser is the INTERNET EXPLORER MOBILE® browser developed by Microsoft Corp. of Redmond, Wash. The meeting participant, using the handheld collaboration machine 104A, may navigate to a designated network location (e.g., website) using the browser 112. At least a portion of the content within the online meeting environment may be presented to the participant via the browser 112. In alternate embodiments, the handheld collaboration machine may host a dedicated client application for accessing the online meeting environment.

The handheld collaboration machine 104B, in example embodiment, is shown to host a dedicated online meeting mobile application 110. The mobile application 110 is a software application that is directed to participation in the online meeting environment. The mobile application 110 may be provided based on the specific capabilities of the handheld collaboration machine 104B. In some instances, the mobile application 110 may comprise a widget or plug-in application accessed via a browser such as browser 112. The mobile application 110 may, for example, be authored using JavaScript® scripting language licensed by Sun Microsystems of Santa Clara, Calif., Ajax web development techniques, ADOBE® FLASH® multimedia web platform by Adobe Microsystems, Inc. of San Jose, Calif., ADOBE® FLEX® software development kit by Adobe Microsystems, Inc. of San Jose, Calif., and may execute within the Adobe® Integrated Runtime (AIR™) cross-platform environment by Adobe Microsystems, Inc. of San Jose, Calif.

The non-handheld collaboration machine 106 is a non-handheld computing device such as a laptop computer or a desktop computer. In some instances, the non-handheld collaboration machine 106 may be communicatively coupled to a telephone or may otherwise provide telephony capabilities (e.g., by hosting a voice over IP (VoIP) application that facilitates telephonic communications over a broadband Internet connection). Alternatively, a user may participate in the online meeting environment using a telephone. In other instances, the non-handheld collaboration machine 106 may include a microphone and a speaker. The non-handheld collaboration machine 106 may host a browser and/or an online meeting application. The online meeting application, which may run within the context of a browser or as an independent application, may itself provide telephony capabilities (e.g., VoIP functionality) to enable telephonic participation by users within an online meeting. The non-handheld collaboration machine 106 may be able to access and display a full complement of components of the online meeting environment. Certain non-handheld machines may have restrictions or capability limitations that may prevent, or it least make it undesirable to, display a full set of components of an online meeting environment on a display device of such a non-handheld machine. For such non-handheld machines, the example methods discussed below may be applied to modify or customized to the online meeting environment based on the restrictions or limitations of non-handheld machine. It should also be s noted that the online meeting architecture 100 need not include the non-handheld collaboration machine 106 to perform the described embodiments.

Figure 2:
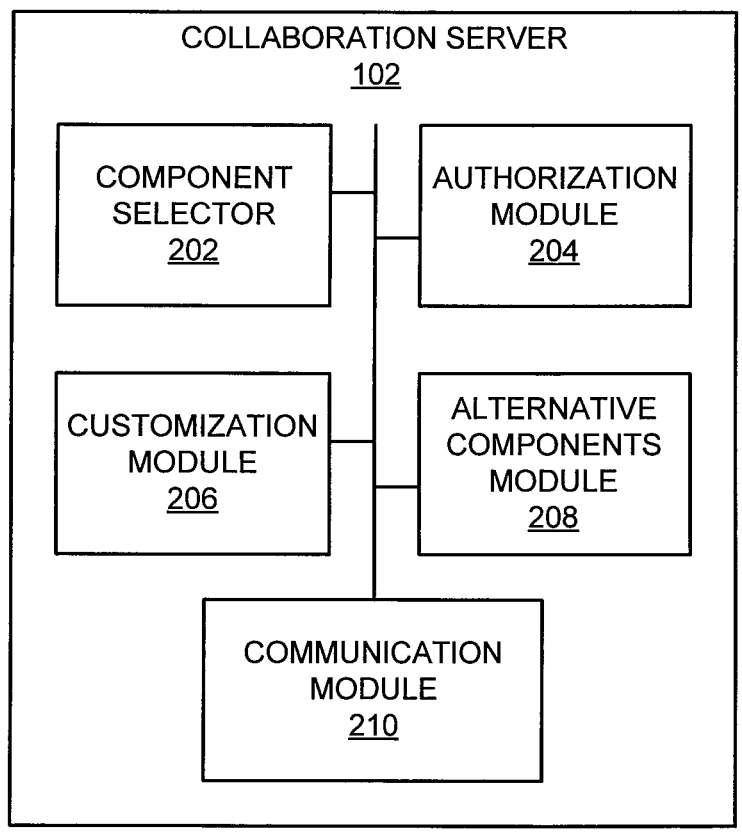
FIG. 2 is a block diagram of an example of a collaboration server according to various embodiments.

Referring to FIG. 2, a block diagram of an example of a collaboration server 102 according to various embodiments is shown. The collaboration server 102 comprises one or more modules in electronic communication with one another for implementing an online meeting environment 100. The collaboration server 102 comprises a component selector 202, a authorization module 204, a customization module 206, an alternative components module 208, and a communication module 210.

The component selector 202 may be accessed by a meeting organizer (not shown) to instantiate an online meeting in the online meeting environment 100. To instantiate the online meeting, the meeting organizer may access the component selector 202 using a collaboration machine (e.g., handheld collaboration machines 104A and 104B, or non-handheld collaboration machine 106) by signing in to the online meeting environment using, for example, a username and password combination. The component selector 202 may generate and/or transmit a graphical user interface (GUI) to the collaboration machine. Using the collaboration machine, the meeting organizer may select one or more components to be included in the online meeting. In some instances, the meeting organizer is able to provide participant information, and a date and time of the online meeting via the component selector 202.

During an online meeting, the collaboration machines 102, 104A and 104B may, for each component associated with an online meeting, access one or more sub-components (not shown). Sub-components may include, for example, a user interface sub-component and other subcomponents to analyze data associated with the component to modify the user interface in response to an action by a meeting participant. For example, a text chat component may comprise one or more sub-components that receive a chat "message" and cause the sender, time and text to be display on a user interface. Another sub-component may provide the ability to display notifications when an event occurs on a specific component. (e.g., if a new chat message arrives and the chat component is not currently visible, a notification like a sound, popup or highlighted button will make the user aware of the new chat message). Examples of components include, but are not limited to, playback of audio recordings, substantially real-time audio transmission, audio reception, audio recording, document viewer, document editor, form-filler, image previewer, image editor, whiteboard, text chat, file downloading, video viewer, video editor, participant list, timer, etc. The embodiments disclosed herein are not limited by way of the components actually available in a specific online meeting environment 100 or that are provided by the collaboration server 102.

The collaboration server 102 may send the meeting information to the participants who may, in turn, join the online meeting via the collaboration machines at the specified date and time. The online meeting may be initiated when one or more participants sign-in to the online meeting via the authorization module 204. The authorization module 204 may provide a sign-in GUI for handheld collaboration machines that is distinct from a sign-in GUI for non-handheld collaboration machines in response to an indication that a handheld machine is being used. For example, the sign-in GUI for a handheld machine may use less bandwidth, have a text input interface that does not require a full keyboard, and/or require less display area. For example, the mobile application 110 may send a unique device identification code (like phone number and/or phone-unique I.D.) that the collaboration server will use to identify the owner.

Upon receiving sign-in information from a handheld collaboration machine, the customization module 206 communicates with the handheld collaboration machine to customize the online meeting. The customization of the online meeting may include removing, adding, or substituting components.

In some embodiments, the customization is based on one or more customization factors. The term, "customization factors" as used herein, is intended to broadly encompass data communicated between the collaboration server and the collaboration machine for providing one or more user interfaces of the online meeting. While customization factors are typically communicated where the collaboration machine is a handheld machine, the customization factors (or a portion thereof) may also be communicated where the collaboration machine is not a handheld machine. Notably, the customization factors are distinct from changes to the user interfaces caused by the communications between participants during the online meeting. The customization factors may be communicated before, during, or subsequent to the online meeting. Customization factors may indicate the hardware, software, and/or networking capabilities of the handheld machine. Some customization factors are based on one or more user-specific attributes such as preferences, default settings, location, etc. In some instances, at least a portion of the customization factors are provided in response to a communication from the collaboration server indicating one or more components or characteristics of the components included within the online meeting. In these instances, the customization factors may or may not include a mode indicator that provides customization data based on a predetermined mode. Customization factors, such as mode information, may be communicated as part of a sign-in process, based on, for example, a selected username (e.g., "John_Smith_Handheld" vs. "John_Smith_Office") or a dial-in number used by the user to access the online meeting. Examples of customization factors include, but are not limited to, available bandwidth, roaming status, available software applications, geographic location, processing power, screen size, camera, time zone, etc.

To remove a component, the customization module 206 determines that the component cannot or may not process the component correctly. For example, a whiteboard component may require the FLASH® player distributed by Adobe Systems Incorporated of San Jose, Calif. Some handheld collaboration machines may not support the player. For these handheld machines, the whiteboard component may be removed from the online meeting for the handheld machine. It is noted that the whiteboard component (or any other component using the FLASH® player) is still part of the online meeting and that other participants are able to interact using the whiteboard via other handheld collaboration machines and/or non-handheld collaboration machines.

In some instances, a component may be added to the presentation of the online meeting. The added component may or may not be added to replace one or more functionalities of a removed component. For example, a component for displaying a list of participants may be provided to the handheld collaboration machine that might not otherwise be included in the online meeting as it is presented to other users. The list of participants may, in some instances, be added to replace a web camera display of the other participant in the online meeting. The additional component may be selected based on various customization factors such as geographical location, time zone, or the like.

In some instances, a component is modified by the customization module 206 based on one or more customization factors specific to the collaboration machine. Examples of customization factor include, but are not limited to, bandwidth, available memory, display size, geographic location, and software installed on the collaboration machine. Alternatively or additionally, a dial-in number or a network address to access the online meeting (e.g., an international dial-in number) may be changed.

The alternative component module 208 may receive a request for an alternative component from the customization module 206. The request may include one or more customization factors. The alternative components module 208 may also interrogate the customization module 206 and/or from the handheld collaboration machine for at least a portion of the customization factors. Based on the customization factors, the alternative components module 208 may select an existing alternative component and/or may generate a new alternative component. In some instances, the generation of a new alternative component may comprise modification of an existing alternative component based on the customization factors.

A video feed to be received or transmit by the handheld machine may be replaced by one or more still images. Where more bandwidth is available, a video feed may be down sampled, instead of replaced with still images. For online meeting using components having interactive or non-interactive visuals, the visuals may be reformatted as one or more still images in a less bandwidth-expensive format such as JPEG, MPEG, or the like. In some instances, the images are down sampled or cropped to, among other things, display properly on a smaller display. These visuals may be generated using components such as a whiteboard, form-filler, document editor, and/or a document or slideshow viewer. For online meetings including a text chat component, a short message service (SMS) may be used to receive or transmit messages.

The alternative components module 208 may determine the alternative components based on heuristics, tables, or artificial intelligence engines (e.g., neural networks). The alternative components module 208 may provide the alternative components, or access to the alternative components, to the customization module 206.

The communication module 210 coordinates communication in the online meeting environment 100. The communication module 210 may receive input from each collaboration machine in an online meeting environment that is signed-in to an online meeting. The communication module 210 may route the components of the online meeting to each collaboration machine and/or to a subset of the collaboration machines. During an online meeting, the communication module 210 may communicate changes to each of the components made by the participants between the collaboration machines.

Figure 3:
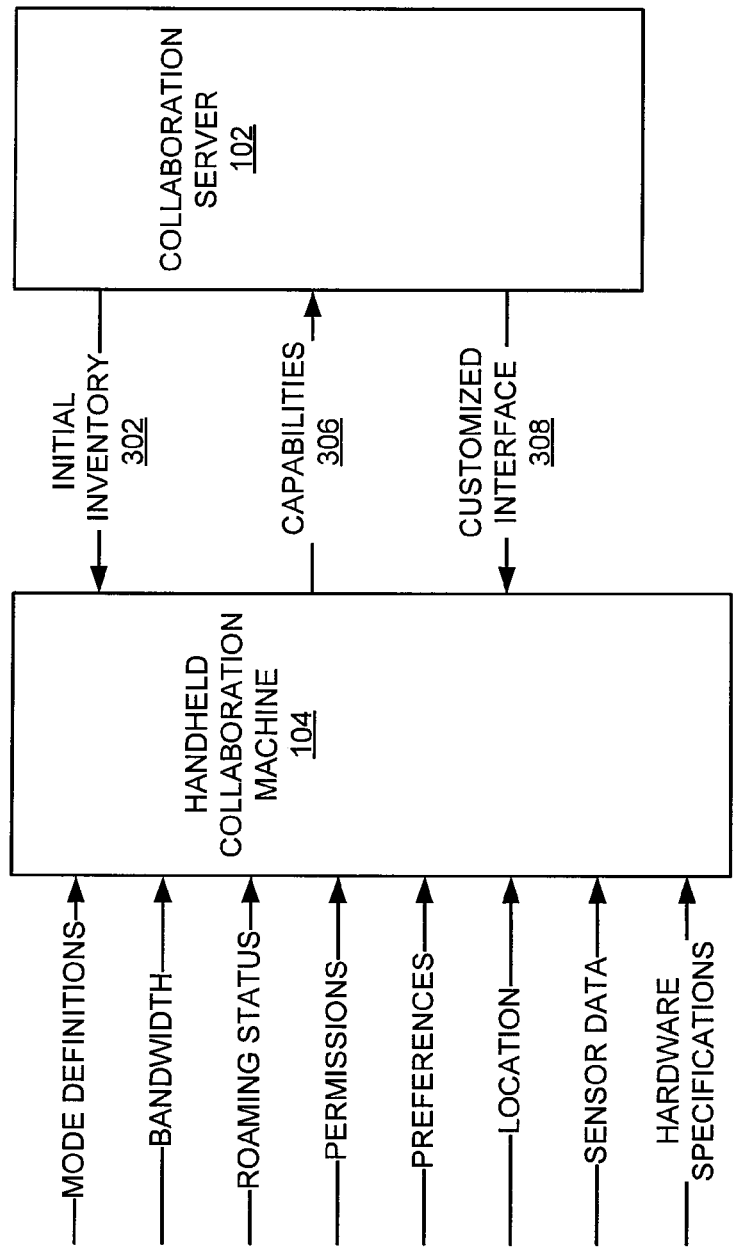
FIG. 3 is a block diagram of data communicated with a handheld collaboration machine according to various embodiments.

Referring now to FIG. 3, a flow diagram of example data communicated between a collaboration server 102 and a handheld collaboration machine 104 is provided.

Upon signing-in to an online meeting, the collaboration server 102 may send an initial inventory 302 of the components selected by the meeting organizer for the online meeting. The initial inventory may be sent to both handheld collaboration machines and to non-handheld collaboration machines. The initial inventory may or may not include one or more base components that are required to participate in the online meeting regardless of the capabilities of the collaboration machine. The collaboration server 102 may additionally or alternately communicate to the collaboration machines which alternative components are available for the online meeting.

When the initial inventory is received, the handheld collaboration machine 104 may identify, select, and/or determine one or more customization factors 304. The customization factors may be specific to the hardware, software, and/or networking capabilities of the handheld collaboration machine. Some of the customization factors 304 may be provided by the user of the handheld collaboration machine. Non-limiting examples of customization factors 304 shown in FIG. 3 include mode definitions, bandwidth, roaming status, permissions, user preferences, location, and sensor data.

Mode definitions describe modes of operation of the handheld collaboration machine during an online meeting. The mode definitions may include pre-existing instructions for customization module 206 and/or the alternative components module 208. The mode definitions may be provided in part by the user via, for example, a GUI for receiving the mode definitions. In some instances, the handheld collaboration machine includes more than one mode definition. In these instances, the mode definition actually implemented by the handheld collaboration machine 104 are determined based on conditions that affect the ability of the handheld machine to communicate with the collaboration server 102 such as bandwidth availability, roaming status, and the like. The mode definitions may alternatively or additionally be provided by the collaboration server 102.

Based on the customization factors 304, the handheld collaboration machine 104 communicates one or more capabilities 306 back to the collaboration server 102. In some instances, the handheld collaboration machine 104 may provide its capabilities to the collaboration server 102 without first receiving an initial inventory 302. The capabilities 306 may comprise a mode indicator, a desired inventory of components, and/or one or more customization factors. The mode indicator may indicate that the handheld collaboration machine is operating, or will operate, in a specific mode. The collaboration server 102 may access one or more mode definitions to customize the components in the online meeting environment. The desired inventory may include a portion of the initial inventory of components that the handheld collaboration machine operates. The desired inventory may or may not include alternative components or replacement components.

In response to receiving the capabilities 306, the collaboration server 102 is configured to contribute to the customization of the interface 308 of the online meeting for the handheld collaboration machine. A portion of the customization of the interface may alternatively or additionally be performed by the handheld collaboration machine. The customized interface 308 may be generated by selecting components using the customization module 206 and/or the alternative component module 208. Communications received during the online meeting from other participants may be modified by the alternative components and/or the replacement components prior to transmission to the handheld collaboration machine. If no capabilities 306 are received by the collaboration serve 102, the collaboration server 102 may assume that the collaboration machine is a non-handheld collaboration machine and provide all of the components included in the initial inventory having been selected for the online meeting by the meeting organizer.

Figure 4:
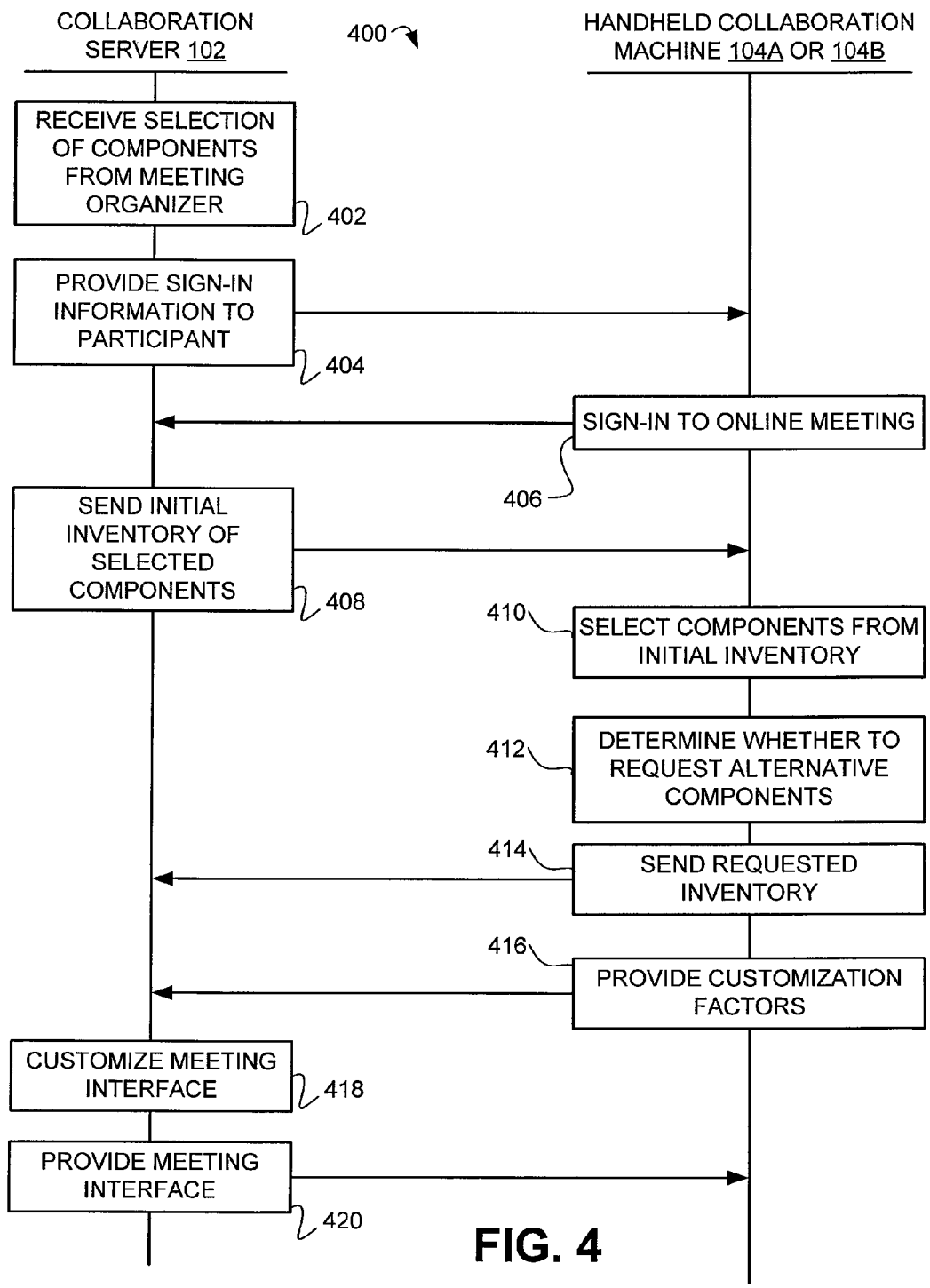
FIG. 4 is a communication flow diagram of communications sent between a collaboration server and a handheld collaboration machine in an example approach according to various embodiments.

FIG. 4 is a communication flow diagram of communications sent between the collaboration server and a handheld collaboration machine in an example approach according to various embodiments. The example approach 400 may be performed if the handheld collaboration machine 104 accesses the online meeting using a browser 112 of the handheld collaboration machine 104A.

In an operation 402, a selection of one or more components is received from a meeting organizer. The meeting organizer may select the components using a handheld collaboration machine 104 (i.e., handheld collaboration machines 104A and 104B) and/or a non-handheld collaboration machine 106. The selection of components may be made independently of the collaboration machine(s) to be used by the participants to access the online meeting.

In an operation 404, sign-in information is provided to one or more invited users of the online meeting. The sign-in information may include a date and time of the online meeting, a meeting identifier, a user identifier, etc. The sign-in information may or may not include the component selection or capability requirements such as hardware requirements, software requirements and/or bandwidth requirements.

In an operation 406, at least one invited user may provide sign-on information to the collaboration server 102 using the handheld collaboration machine 104. In response, the collaboration server 102 sends an initial inventory of selected components. The initial inventory may be accompanied by further component metadata data such as anticipated bandwidth use, hardware and software requirements, display requirements, etc. The initial inventory may or may not be identical to the components selected by the meeting organizer.

In some instances, the sign-on information may indicate that a handheld collaboration machine is used and the collaboration server 102 may modify the selected components to generate an initial inventory separate from the components selected by the meeting organizer. The collaboration machine can send a set of capabilities to the server, like screen dimensions, type of controls (touch-screen, keys/keyboard, trackball, etc.), network connection (wireless, 3G, 2G, etc.), audio/video support, etc. In handheld collaboration machines 104, a FlashPlayer application may include a set of application programming interfaces (APIs) to retrieve these capabilities. On other handheld collaboration machine (e.g., handheld collaboration machine 104B), these capabilities can be hardcoded in the mobile application 110. A different implementation may send an application identifier such as a version number of an installed FlashPlayer or a version number of a mini browser to the collaboration server 102. In this implementation, the server may access a table that maps the application identifier to the capabilities or supported components of the handheld collaboration device.

In an operation 410, the handheld collaboration machine 104 may select one or more components from the initial inventory. The components may be selected as described above based on one or more customization factors. In embodiments where the handheld collaboration machine 104 has access to data about available alternative components, the handheld collaboration machine 104 may determine whether to request alternative components, in an operation 412.

The handheld collaboration machine 104 sends a desired inventory in an operation 414. The desired inventory may include a selection of a portion of the selected components and/or one or more alternative components. Alternatively or additionally, the handheld collaboration machine 104 provides the customization factors to the collaboration server 102.

In an operation 418, the collaboration server 102, and more specifically, the customization module 206, customizes the meeting interface based on data received via the communications from the handheld collaboration machine 104. The customized meeting interface is then provided in operation 420. The customized interface is provided to the handheld collaboration machine 104. Other participants in the online meeting may simultaneously be provided with an interface provided based solely on the selected components. Further, other handheld collaboration machines 104 may be provided other customized interfaces generated separately from the interface provided in operation 420.

Figure 5:
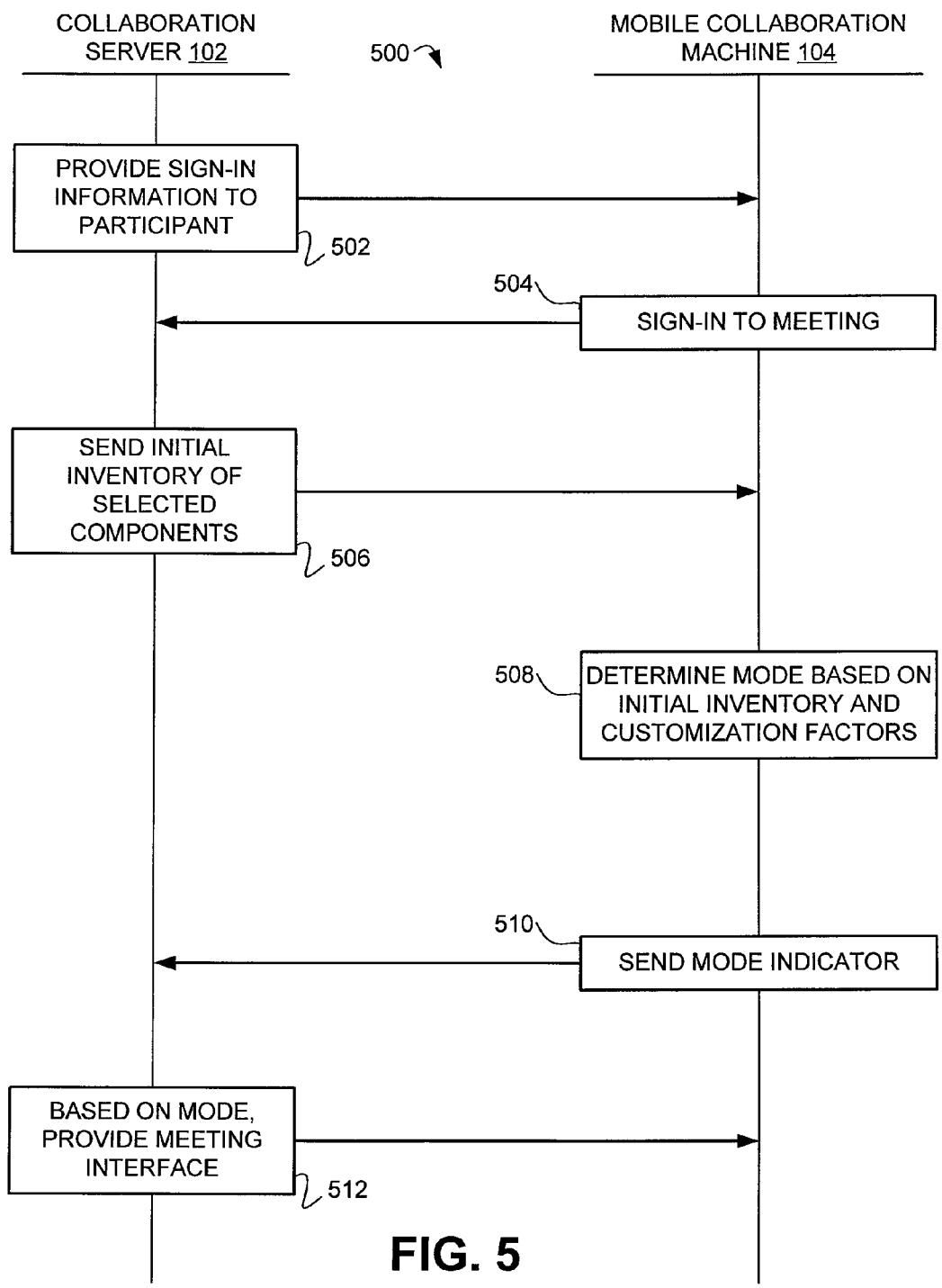
FIG. 5 is a communication flow diagram of communications sent between a collaboration server and a handheld collaboration machine in another example approach according to various embodiments.

FIG. 5 is a communication flow diagram of communications sent between the collaboration server and a handheld collaboration machine in another example approach according to various embodiments. More particularly, the example approach 500 may be performed if the handheld collaboration machine 104 accesses the online meeting using a mobile application 110 of the handheld collaboration machine 104B.

Similar to approach 400, sign-in information is provided to a participant in an operation 502, and the participant signs-in to the meeting in an operation 504. The collaboration server 102 sends the initial inventory in operation 506.

At an operation 508, in response to the initial inventory, the mobile collaboration machine 104 may determine a mode. The mode may be based at least in part on the components in the initial inventory and the customization factors of the mobile collaboration machine 104. Once the mode is determined, the mobile collaboration machine 104 may send a mode indicator to the collaboration server 102 in operation 510.

Upon receipt of the mode indicator, the collaboration server 102 provides a customized meeting interface in operation 512. The collaboration server 102 may access a table or other data structure that defines the mode corresponding to the mode indicator. The definition of the mode may include a portion of components selectable by the meeting organizer, one or more alternative components, and/or hardware, software, or networking specifications.

Figure 6:
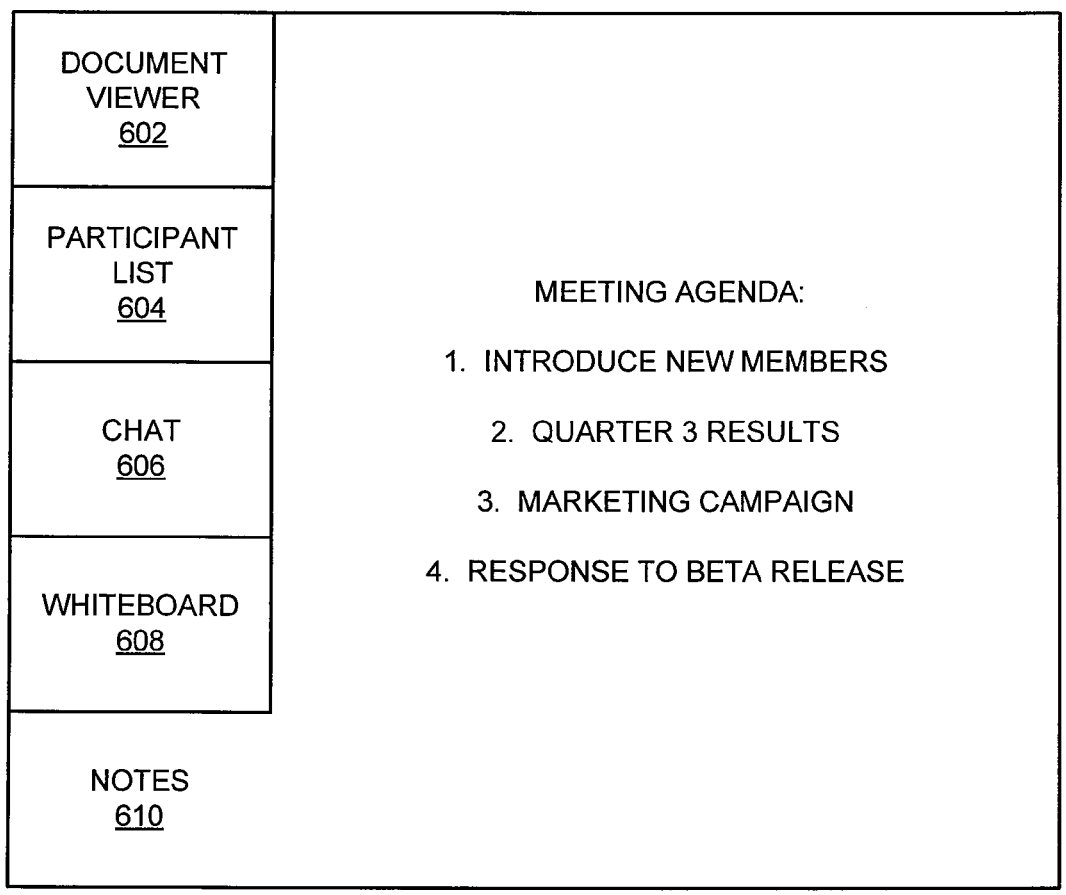
FIG. 6 is an example user interface for an online meeting environment on a first handheld collaboration machine according to various embodiments.

FIG. 6 is an example meeting interface 600 for an online meeting on an example handheld collaboration machine according to various embodiments. The meeting interface 600 comprises five components: a document viewer 602, a participant list 604, a chat component 606, a whiteboard component 608, and a notes component 610. Each of the five components may be part of the selected components of the meeting organizer or may be an alternative component.

Reviewing each example component in turn, some may be selected while others may be alternative components. The document viewer 602, for example, may be a selected component by the meeting organizer or may be an alternative component added to replace another, more expensive, component such as a document editor. The participant list 604 may include a listing of the other participants in the meeting and may or may not include images of the other participants. In some instances, the participant list 604 may be used as a replacement list for another component, such as a web camera. The chat component 606 may be used by a participant to exchange messages with other participants without interrupting a speaker. The whiteboard 608 may comprise an interactive display where each participant may "draw" on a single image. The notes component, as shown, may be used to show an online meeting agenda and may or may not be modifiable by a participant. Some components, such as the whiteboard 608 may be the same as components available to the participants on the non-handheld collaboration machines 106. The components, as shown, are displayed one at a time. The user of the handheld collaboration machine 104 may determine which component to display during the online meeting. However, other participants or GUIs may display more than one component or all available components at a single time.

Figure 7:
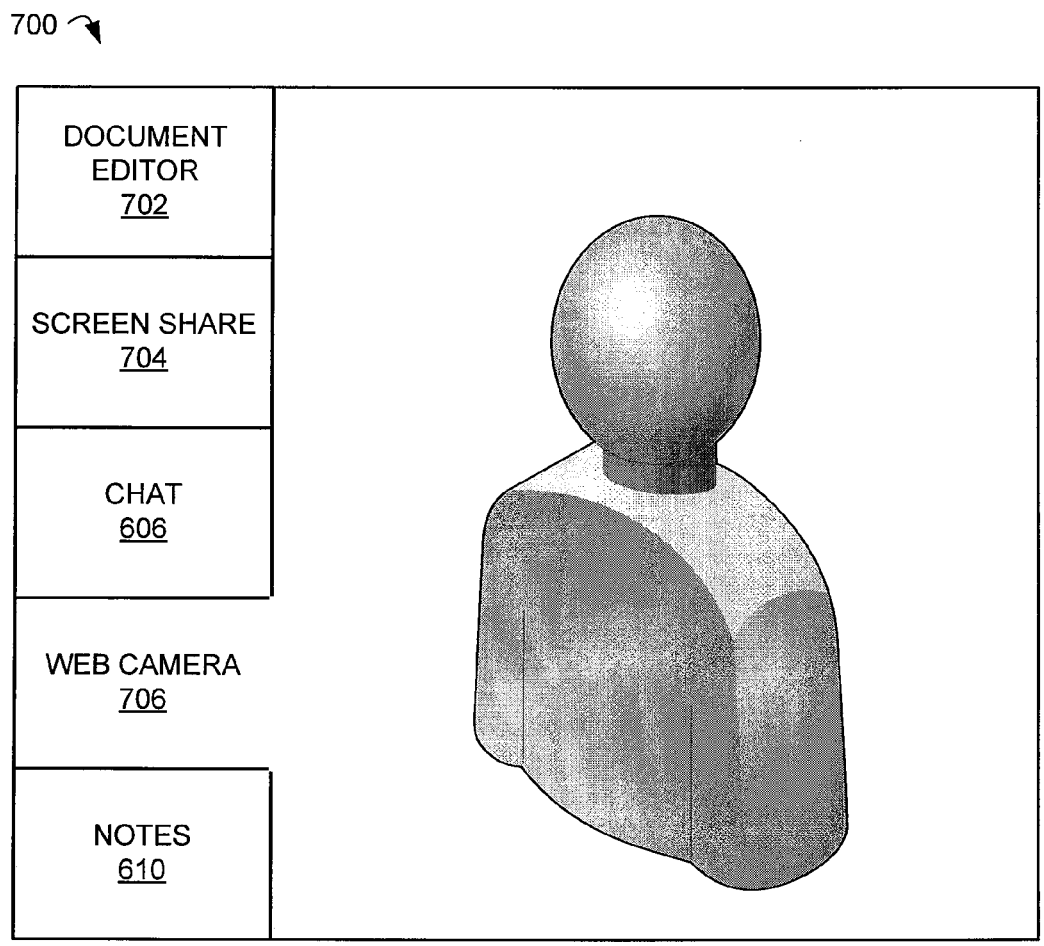
FIG. 7 is an example user interface for an online meeting environment on a second handheld collaboration machine according to various embodiments.

FIG. 7 is an example user interface 700 for an online meeting environment on a second handheld collaboration machine according to various embodiments. The user interface 700 may be associated with the same online meeting as the user interface 600 but displayed at another handheld collaboration machine 104. The user interface 700 comprises a different set of components from the user interface 600. The user interface comprises a document editor 702, a screen share 704, the chat component 606, a web camera 706, and the notes component 610.

The documents editor may be included in the user interface 700 but not in the user interface 600 based on one or more of the customization factors. The screen share 704 may be an alternative component for another component, such as the whiteboard 608. The web camera 706 may be included instead of a participant list 604.

In the example interfaces as shown, a display associated with a single component comprises a significant portion of the display. If, for example, another participant in the online meeting performs an action using a component other than the one currently displayed, the user of the handheld collaboration device may be notified by a sound or by a change in the display. The change in display may include a visual indicator such as a pop-up window or a change or addition to an icon representing the component where the action was performed.

In some instances, the display may automatically switch to another component when the action is performed. In instances where other participants are performing actions using more than one component at a time, e.g., if a portion of the participants leave the online meeting (causing a change in a participant list) and another portion continues to act in a whiteboard module, the handheld collaboration machine and/or the collaboration server may actively determine which component to show. For example, the whiteboard may be shown instead of the participant list if the user of the handheld collaboration device is also performing actions using the whiteboard. If, however, the user of the handheld collaboration device is a moderator of to online meeting, the participant list may be displayed instead. The determination may be made based on, for example, a most recent activity, a time-out period, a set of heuristics, a priority ranking of the components, or the like.

Figure 8:
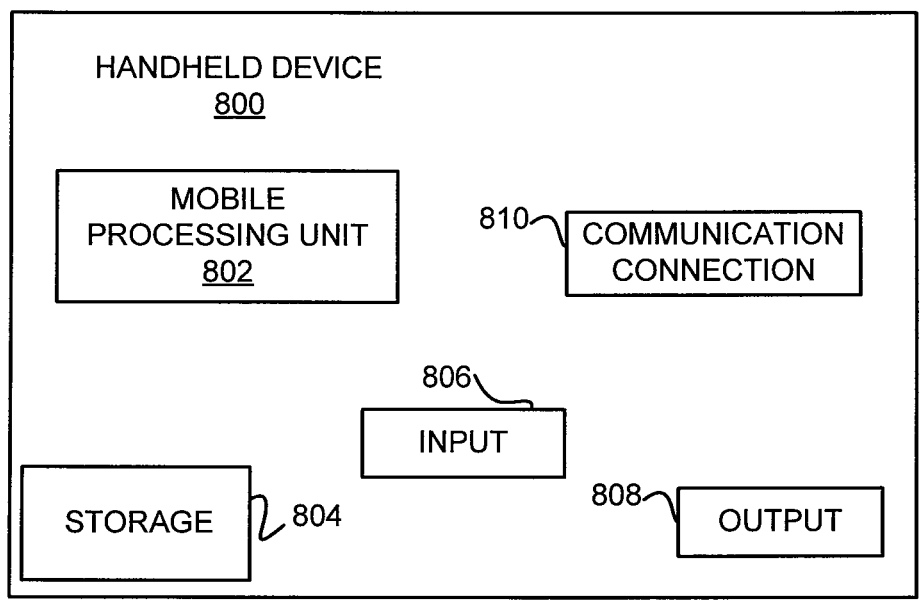
FIG. 8 is a block diagram of an exemplary handheld device that may be used to perform the approaches described here.

FIG. 8 is a block diagram of an exemplary handheld device 800 that may be used in some embodiments as a handheld collaboration machine 104. In different embodiments, handheld device 800 may be any of various types of devices, including, but not limited to, handheld computer, a consumer electronics device such as a camera, camcorder, music player, mobile device, handheld video game device, or in general any type of computing or electronic device that is capable of being handheld. A handheld device 800 may include mobile processing unit 802 and storage 804. Storage 804 may include volatile memory and nonvolatile memory. Computer storage includes random access memory (RAM), read-only memory (ROM), erasable programmable read-only memory (EPROM) and electrically erasable programmable read-only memory (EEPROM), flash memory or other memory technology, compact disc read-only memory (e.g. ROM), digital versatile disks (DVD) or other optical disk storage, magnetic cassettes, magnetic tape, it is storage or other magnetic storage devices, or any other medium capable of storing computer-readable instructions. Handheld device 800 may include or have access to input 806, output 808, and a communication connection 810. The handheld device 800 may operate in a networked environment using the communication connection 810 to connect to one or more remote computers, such as database servers. The remote computer may include a personal computer (PC), server, router, a network PC, a peer device, or other common network node, or the like. The communication connection may include a local area network ("LAN"), a wide area network ("WAN"), the Internet, a cellular network (e.g., Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN)) or other networks.

In some instances, the systems and operations described herein in connection with handheld collaboration devices may be implemented using a non-handheld device such as, but not limited to any of various types of devices, including, a personal computer system, desktop computer, laptop, notebook, or netbook computer, mainframe computer system, workstation, network computer, application server, storage device, a consumer electronics device such as a set top box, video game console, a peripheral device such as a switch, modem, router, or in general any type of computing or electronic device.

Certain example embodiments may facilitate presenting online meeting environments on a handheld device. The presentation may be modified from an online meeting environment that is typically accessed using a larger, non-handheld device to allow participants who do not have immediate access to the non-handheld device to access the online meeting environment using a handheld device.

In the foregoing detailed description, reference is made to the accompanying drawings that form a part hereof, in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter.

The foregoing description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on a computer readable medium such as memory or other type of storage devices. Further, described functions may correspond to modules and/or engines, which may include software, hardware, firmware, or any combination thereof. Multiple functions are performed in one or more modules and/or engines as desired, and the embodiments described are merely examples. The software is executed on a digital signal processor, ASIC, microprocessor, or other type of processor operating on a system, such as a personal computer, server, a router, or other device capable of processing data in the network interconnection devices.

Some embodiments implement the functions in two or more specific interconnected hardware-implemented (e.g., processor-implemented) modules, engines, or devices with related control and data signals communicated between and through the modules or engines, or as portions of an application-specific integrated circuit. Thus, the exemplary process flows are applicable to software, firmware, and hardware implementations.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

It is emphasized that the abstract is provided to comply with 37 C.F.R. §1.72 (b) requiring an Abstract that will allow the reader to quickly ascertain the nature and gist of the technical disclosure. It is submitted with the understanding that it will not be used to interpret the scope or meaning of the claims.

In the foregoing Detailed Description, various features are together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the above Detailed Description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

It will be readily understood by those skilled in the art that various other changes in the details, material, and arrangements of the present method stages which have been described and illustrated in order to a explain the nature of the inventive subject matter may be made without departing from the principles and scope of the inventive subject matter as expressed in the subjoined claims.

What is claimed is:

1. A computer-implemented method comprising:
   receiving sign-in information from a collaboration machine comprising a mobile device, the sign-in information corresponding to an online meeting environment comprising a plurality of components;
   identifying a limitation of the mobile device;
   modifying the online meeting environment to selectively include a subset of the plurality of components based on the limitation to generate a modified online meeting environment for the mobile device,
      the plurality of components providing a functionality to participants of an online meeting,
         and the generating of the modified online meeting environment comprising including, within the modified online environment for the mobile device, visual indicators representative of a further subset of the plurality of components,
         the further subset of components being hidden within the modified online meeting environment for the mobile device based on the limitation; and
   providing the modified online meeting environment to the mobile device.

2. The computer-implemented method of claim 1 wherein the subset of the plurality of components comprises a single component selected from the plurality of components.

3. The computer-implemented method of claim 1 wherein the modifying of the online meeting environment comprises selecting the subset based on participant activity within the online meeting environment so that the subset includes a component for which the participant activity most recently occurred.

4. The computer-implemented method of claim 1, the method further including detecting participant activity with respect to a hidden component of the further subset of components within the modified online environment for the mobile device, and providing a notification of the participant activity within the modified online environment.

5. The computer-implemented method of claim 1 wherein the online meeting environment is accessed by at least one participant using a further collaboration machine, and further comprising:
   at a collaboration server, providing the online meeting environment to the further collaboration machine.

6. The computer-implemented method of claim 1 wherein the limitation comprises a hardware specification of the mobile device.

7. The computer-implemented method of claim 1 wherein the modifying of the online meeting environment for the mobile device further comprises selecting an alternative component to a further subset of components of the plurality of components based on the limitation.

8. The computer-implemented method of claim 1 wherein the modifying of the online meeting environment for the mobile device comprises reformatting content corresponding to one of the plurality of components.

9. The computer-implemented method of claim 1 wherein the modifying of the online meeting environment for the mobile device comprises converting a video feed into one or more still images.

10. The computer-implemented method of claim 1 wherein the modifying of the online meeting environment for the mobile device comprises providing a still image of a drawing in a whiteboard component of the plurality of components.

11. The computer-implemented method of claim 1 wherein the limitation includes at least one of:
    a geographic location of the mobile device;
    an application installed on the mobile device; and
    a mode indicator indicating a mode of the mobile device, the mode corresponding to the subset of the plurality of the components.

12. The computer-implemented method of claim 1 wherein the modifying of the online meeting environment comprises:
    determining whether to send first data having a first size using a first connection having a first bandwidth or a second data having a second size using a second connection having a second bandwidth to the mobile device based on the limitation, the first bandwidth being higher than the second bandwidth, and
    sending the first data to a participant via a non-handheld collaboration machine.

13. The computer-implemented method of claim 1, the method further comprising:
    receiving, at the collaboration server, a selection of the plurality of components corresponding to the online meeting environment, each component of the plurality of components for execution on a further collaboration machine.

14. A computer readable storage medium having embodied thereon instructions executable by a processor for performing a method for providing a customized interface to a mobile device, the method comprising:
    receiving sign-in information from a mobile device, the sign-in information corresponding to an online meeting environment comprising a plurality of components;
    identifying a limitation of the mobile device;
    modifying the online meeting environment to selectively include a subset of the plurality of components based on the limitation of the mobile device to generate a modified online meeting environment for the mobile device, the plurality of components providing a functionality to participants of an online meeting,
        and the generating of the modified online meeting environment for the mobile device comprising including, within the modified online environment, visual indicators representative of a further subset of the plurality of components,
            the further subset of components being hidden within the modified online meeting environment for the mobile device based on the limitation; and
    displaying the customized interface to a user of the mobile device.

15. The computer-readable medium of claim 14 wherein the limitation comprises a mode indicator, the mode indicator corresponding to a mode definition accessible by the collaboration server for generating the customized interface.

16. The computer-readable medium of claim 14 wherein the mobile device comprises a mobile application to access the collaboration server.

17. A computer apparatus comprising:
    at least one processor to implement a customization module to provide a customized interface comprising a plurality of components to a mobile device based on a selection of components and a limitation of the mobile device, the components providing a functionality to participants of an online meeting; and
    an alternative component module to store one or more alternative components, each alternative component to replace at least one component of the selection of components in the customized interface.

18. The computer apparatus of claim 17 wherein the alternative component module is to receive the limitation from the mobile device.

19. The computer apparatus of claim 17 wherein the selection of components correspond to an online meeting environment.

20. A computer-implemented method comprising:
    receiving an identifier corresponding to an online meeting environment from a mobile device, the online meeting environment comprising an interactive component;
    determining that the mobile device is not able to provide the interactive component to a user;
    modifying the online meeting environment for the mobile device by providing an alternative component in addition to the interactive component, the alternative component and the interactive component providing a functionality to participants of an online meeting; and
    providing the alternative component to the mobile device.

* * * * *